United States Patent
Allport et al.

[11] 3,944,905
[45] Mar. 16, 1976

[54] BATTERY CHARGING SYSTEMS FOR ROAD VEHICLES

[75] Inventors: Maurice James Allport, Stourbridge; David Gordon Williams, Birmingham, both of England

[73] Assignee: The Lucas Electrical Company Limited, Birmingham, England

[22] Filed: Dec. 4, 1974

[21] Appl. No.: 529,276

[30] Foreign Application Priority Data
Dec. 8, 1973 United Kingdom............... 57012/73

[52] U.S. Cl. ...................... 320/48; 320/64; 322/28; 322/99; 317/33 VR
[51] Int. Cl.² .......................................... H02J 7/14
[58] Field of Search ............ 320/48, 61, 64; 322/28, 322/99; 317/13 R, 33 VR

[56] References Cited
UNITED STATES PATENTS

| | | | |
|---|---|---|---|
| 3,469,168 | 9/1969 | Harland, Jr. et al............. | 322/28 X |
| 3,492,559 | 1/1970 | Harris................. | 322/99 X |
| 3,835,367 | 9/1974 | Wiley..................... | 322/28 |

Primary Examiner—J. D. Miller
Assistant Examiner—Robert J. Hickey
Attorney, Agent, or Firm—Kane, Dalsimer, Kane, Sullivan and Kurucz

[57] ABSTRACT

A road vehicle battery charging system includes an alternator, and a rectifier connecting the alternator across a battery. A further rectifier provides an additional d.c. output for energising the field winding of the alternator and this additional output is connected to the appropriate battery terminal via an ignition switch. A voltage sensing circuit operates to illuminate a warning lamp should the voltage on the line exceed a predetermined level.

4 Claims, 1 Drawing Figure

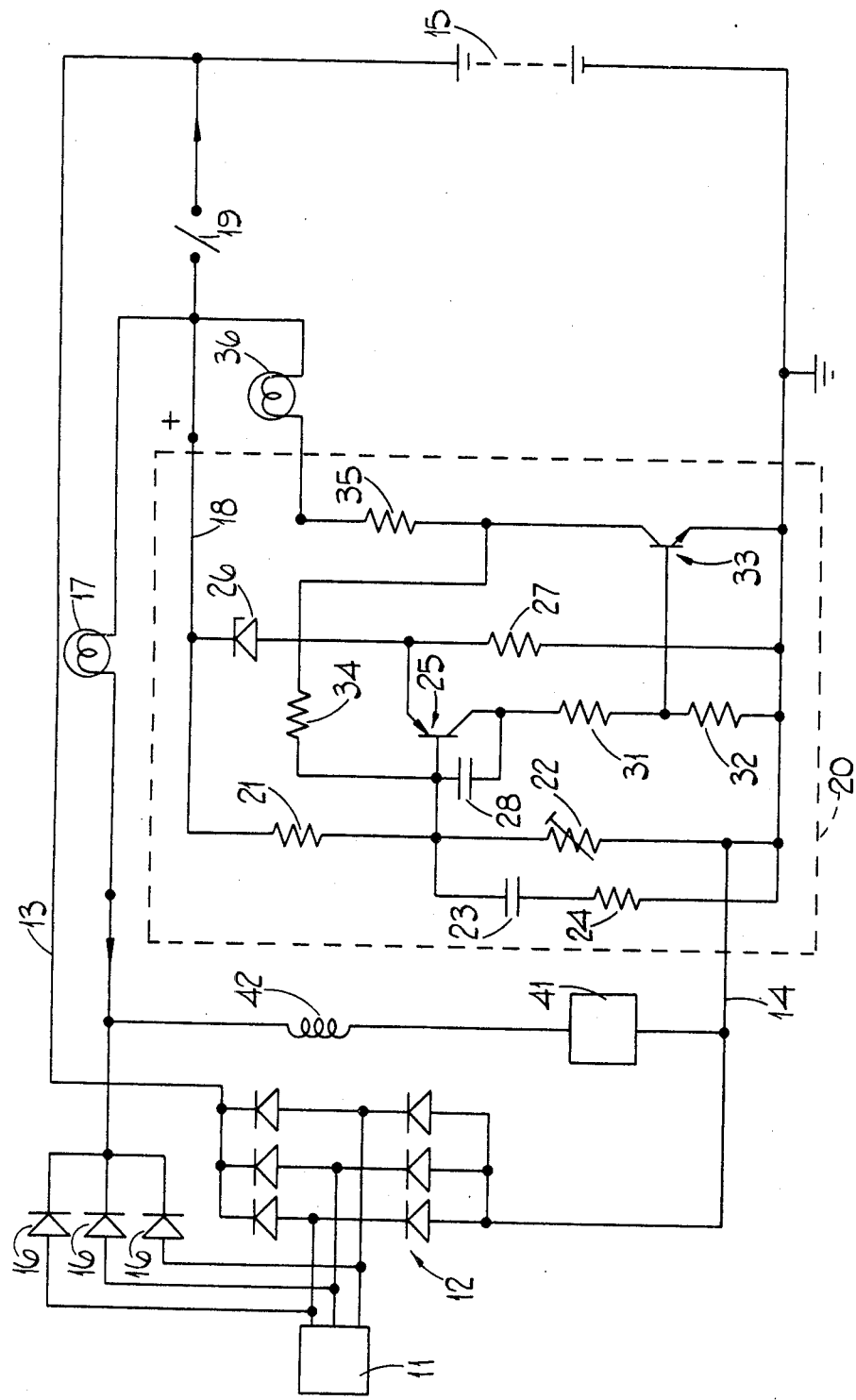

BATTERY CHARGING SYSTEMS FOR ROAD VEHICLES

This invention relates to battery charging systems for road vehicles.

A battery charging system according to the invention comprises in combination an alternator and associated rectifier providing power to first and second supply lines between which the vehicle battery is connected, the alternator also providing power to a third supply line which in use will be at substantially the same potential at the first supply line, an ignition switch coupling the third and first supply lines, and voltage sensitive means connected between the third and second supply lines for giving a warning if the potential on the third supply line exceeds a predetermined value.

The accompanying drawing is a circuit diagram illustrating one example of the invention.

Referring to the drawing, an alternator 11 provides power by way of a full wave rectifer 12 to positive and negative supply lines 13, 14 between which the vehicle battery 15 is connected. The alternator also supplies power through three additional diodes 16 and a warning lamp 17 to a line 18 which in use will be at substantially the same potential as the line 13. The line 18 is connected to the line 13 through the ignition switch 19 of the vehicle. A voltage sensing circuit 20 is provided for illuminating a warning lamp 36 when the voltage on line 18 is excessive.

Connected in series between the lines 18, 14 are a pair of resistors 21, 22, the resistor 22 being bridged by a capacitor 23 and a resistor 24 in series. The junction of the resistors 21, 22 is connected to the base of a p-n-p transistor 25 having its emitter connected to the junction of a zener diode 26 and resistor 27 bridging the lines 18, 14. The collector and base of the transistor 25 are bridged by a capacitor 28 which prevents high frequency oscillation, and the collector is further connected to the line 14 through a pair of resistors 31, 32 in series, the junction of the resistors 31, 32 being connected to the base of an n-p-n transistor 33, the emitter of which is connected to the line 14 and the collector of which is connected through a resistor 34 to the base of the transistor 25 to provide a feedback to give clean switching of transistor 25, and is further connected through a resistor 35 and the warning lamp 36 in series to the line 18.

The alternator output is controlled by a voltage regulator 41 connected in series with the field winding 42 of the alternator between the line 14 and the junction of the diode 16 and warning lamp 17. When the ignition switch 19 is closed, the voltage regulator is energised by way of the warning lamp 17, which is illuminated. However, when the alternator is producing an output, the diodes 16 feed the voltage regulator 41, and the warning lamp 17 is extinguished.

When the ignition switch is closed, the potential on the line 18 rises, and the zener diode 26 conducts to set the emitter potential of the transistor 25 relative to the line 18. Upon closing the ignition switch 19, the capacitor 23 will be discharged, and so the transistor 25 conducts momentarily while the capacitor 23 charges, causing the transistor 33 to turn on and the lamp 36 to flash momentarily, giving the driver an indication that the lamp 36 is operating satisfactorily. Once the capacitor 23 is charged, however, the base potential of the transistor 25 is such that the transistor 25 is off, so that the lamp 36 is extinguished. This of course assumes that the potential on the line 18 is at its normal value, but if the potential on the line 18 rises for any reason to an unacceptable level, then at a predetermined potential the transistor 25 turns on again to turn the transistor 33 on and illuminate the lamp 36, so giving a warning to the driver that there is a fault, probably in the voltage regulator.

We claim:

1. A battery charging system for a road vehicle comprising in combination an alternator and associated rectifier providing power to first and second supply lines between which the vehicle battery is connected, the alternator also providing power to a third supply line which in use will be at substantially the same potential at the first supply line, an ignition coupling the third and first supply lines, and voltage sensitive means connected between the third and second supply lines for giving a warning if the potential on the third supply line exceeds a predetermined value, said voltage sensitive means comprising a p-n-p transistor having its emitter connected, (a) to the third supply line by a zener diode which has its anode connected to the emitter of said p-n-p transistor, and (b) to the second supply line by a resistor whereby a predetermined potential difference is established between the emitter of said transistor and the third supply line, a resistance chain connected between the second and third supply lines and providing a base voltage for the p-n-p transistor such that the latter does not conduct when the voltage between the second and third supply lines is normal, but conducts when the potential on said third supply line exceeds said predetermined valve, and means connected to the collector of said p-n-p transistor for energizing a warning device when said p-n-p transistor conducts.

2. A battery charging system as claimed in claim 1 in which the base of said p-n-p transistor is connected to the second supply line via a capacitor and a resistor in series so that when the ignition switch is closed the p-n-p transistor is rendered conductive whilst said capacitor is charging.

3. A battery charging system as claimed in claim 1 in which said means connected to the collector of the p-n-p transistor comprises an emitter resistance chain connecting the emitter to the second supply line, an n-p-n transistor with its emitter connected to the second supply line and its base connected to said emitter resistance chain, the warning device being a lamp in circuit connected between the third supply line and the collector of p-n-p transistor.

4. A battery charging system as claimed in claim 3 including a feedback resistor connected between the collector of the n-p-n transistor and the base of the p-n-p transistor.

* * * * *

UNITED STATES PATENT OFFICE
CERTIFICATE OF CORRECTION

Patent No. 3,944,905　　　　　　　　Dated　March 16, 1976

Inventor(s) Maurice James Allport & David Gordon Williams

It is certified that error appears in the above-identified patent and that said Letters Patent are hereby corrected as shown below:

Col. 2, line 22, after the word "ignition" should read -- switch --.

Signed and Sealed this

Seventeenth Day of August 1976

[SEAL]

Attest:

RUTH C. MASON
*Attesting Officer*

C. MARSHALL DANN
*Commissioner of Patents and Trademarks*